(12) United States Patent
Haydt, III

(10) Patent No.: US 7,236,935 B2
(45) Date of Patent: Jun. 26, 2007

(54) METHOD AND APPARATUS FOR VERIFYING A MATCH BETWEEN CONTENTS OF AN ENCLOSURE AND DATA PRINTED ON THE ENCLOSURE

(75) Inventor: Leo A. Haydt, III, Raleigh, NC (US)

(73) Assignee: Bowe Bell + Howell Company, Durham, NC (US)

( * ) Notice: Subject to any disclaimer, the term of this patent is extended or adjusted under 35 U.S.C. 154(b) by 602 days.

(21) Appl. No.: 09/752,198

(22) Filed: Dec. 29, 2000

(65) Prior Publication Data

US 2002/0087338 A1  Jul. 4, 2002

(51) Int. Cl.
G06Q 99/00 (2006.01)
G06F 7/00 (2006.01)
G06F 15/16 (2006.01)
G05D 7/00 (2006.01)

(52) U.S. Cl. .................. 705/1; 705/401; 700/223; 701/1; 707/100; 709/246; 713/193

(58) Field of Classification Search ............ 705/1, 705/60, 62, 401, 406, 408, 411; 382/101; 700/223; 701/1; 707/100; 709/246; 713/176, 713/193

See application file for complete search history.

(56) References Cited

U.S. PATENT DOCUMENTS

| | | | | |
|---|---|---|---|---|
| 4,858,907 A | * | 8/1989 | Eisner et al. | 271/124 |
| 5,036,984 A | * | 8/1991 | Labarthe | 209/3.3 |
| 5,288,994 A | | 2/1994 | Berson | 250/223 |
| 5,819,241 A | * | 10/1998 | Reiter | 705/408 |
| 5,898,153 A | | 4/1999 | Lagan et al. | 235/375 |
| 6,073,060 A | * | 6/2000 | Robinson | 700/223 |

(Continued)

OTHER PUBLICATIONS

Cotton, C Richard; "Duo push envelope to shake up direct mail industry scanner can read code inside letter," The Commercial Appeal; Memphis TN, Jan. 26, 1999, p. B 5.*
Cotton, C. Richard, "Duo Push Envelope to Shake Up Direct-Mail Industry Scanner Can Read Code Inside Letter," The Commercial Appeal; Memphis TN, Jan. 26, 1999, p. B 5 (full text).

*Primary Examiner*—Andrew Fischer
*Assistant Examiner*—Charlie C. Agwumezie
(74) *Attorney, Agent, or Firm*—Jenkins, Wilson, Taylor & Hunt, P.A.

(57) ABSTRACT

A method and apparatus provide physical verification of a correct association between information printed on a closed face package and material and/or information contained inside the closed face package. A closed face package with a document or article inserted therein has a window permitting a portion of the document to be read from a location outside of the package. A first optical device is employed to read data printed on the package and a second optical device is employed to read document data, which document data is printed on the inserted document and appears through the window of the package. A data file is read to access account information stored therein corresponding to the document data. The accessed account information is compared with the package data to determine whether a matching association exists between the package data and the document data. If the matching association is determined to exist, the package is allowed to be further processed. If the matching association is determined not to exist, the package is prevented from being further processed.

26 Claims, 4 Drawing Sheets

U.S. PATENT DOCUMENTS 6,168,080 B1 * 1/2001 Verschuur et al. ..... 235/462.01
6,236,009 B1 5/2001 Emigh et al. ............... 209/584
2001/0032881 A1 * 10/2001 Wells et al. ................ 235/385
2002/0087338 A1 7/2002 Haydt, III ..................... 705/1

* cited by examiner

METHOD AND APPARATUS FOR VERIFYING A MATCH BETWEEN CONTENTS OF AN ENCLOSURE AND DATA PRINTED ON THE ENCLOSURE

TECHNICAL FIELD

The present invention relates generally to information or data verification systems. More specifically, the present invention relates to the physical verification of matching associations between information or data contained on separate printed articles.

BACKGROUND ART

Mail inserting systems currently can insert a specific customer's materials into an envelope and then print the customer's address on the outside of the envelope. However, as is well known to persons skilled in the art, software errors as well as other errors do occur nonetheless, and in some cases the wrong customer's name, for instance, is printed on the envelope. Operators of processing equipment can of course tear a mail piece open to sample the process being implemented, but this action destroys the mail piece and does not catch errors in mail pieces not opened in this manner.

Prior to the present invention, it is believed that there was no known automated process by which to prove that a matching of information between the face of an enclosure and its contents were in fact correct. Moreover, there has not been an adequate means of catching the problem upon its occurrence and subsequently stopping the processing until the situation could be resolved. Accordingly, it will be appreciated by those skilled in the art that the ability to provide such automated error detection and prevention would be a significant improvement over existing technology.

The present invention is provided to solve these and other problems associated with the prior technology.

DISCLOSURE OF THE INVENTION

Broadly stated, the present invention provides an apparatus and method for physically verifying that the enclosed contents of a mail piece or other enclosure correctly match the printed address or other information on the mail piece. The present invention has particular application to closed faced addressing. The verification provided by the present invention is advantageously implemented in mail inserting systems, but will be understood as not being limited to such systems.

According to one embodiment of the present invention, a method is provided for physically verifying a correct association between information printed on a closed face package and material and/or information contained inside the closed face package. A closed face package is provided which includes a document inserted within the package. The package has a window permitting a portion of the document to be read from a location outside of the package. One or more reading devices such as optical scanners is provided. In a specific embodiment, a first reading device is employed to read data printed on the package and a second reading device is employed to read document data, the document data having been printed on the inserted document and appearing through the window of the package. A data file is read to access account information stored therein corresponding to the document data. At least a portion of the accessed account information is compared with the package data to determine whether a matching association exists between the package data and the document data. If the matching association is determined to exist, the package is allowed to be further processed. If the matching association is determined not to exist, the package is prevented from being further processed.

According to another embodiment of the present invention, a system is provided for physically verifying a correct association between information printed on a closed face package and material and/or information contained inside the closed face package. The system comprises a storage medium, an electronic processing apparatus, and one or more optical readers. The storage medium contains a data file which includes account information specific to a mail recipient. The electronic processing apparatus is adapted to access the data file and retrieve data forming a part of the account information. The optical reader is adapted to read data printed on a closed face package. The closed face package contains a document or other article, and includes a window through which the document is visible. The optical reader is further adapted to read document data printed on the document and visible through the window of the closed face package, and to send the package data and the document data to the electronic processing apparatus.

According to yet another embodiment of the present invention, a mailpiece processing system is provided comprising a mailpiece processing apparatus, a storage medium, an electronic processing apparatus, and one or more optical readers. The mailpiece processing apparatus includes a mail inserting device for inserting a document into a closed face package and a package printer for printing package data onto the closed face package. The storage medium contains a data file which includes account information specific to a mail recipient. The electronic processing apparatus is adapted to control operations of the mailpiece processing apparatus and to access the data file and retrieve data forming a part of the account information. The optical reader adapted to read data printed on the closed face package. The closed face package contains the document inserted by the mail inserting device and includes a window through which the document is visible. The optical reader is further adapted to read document data printed on the document and visible through the window of the closed face package, and to send the package data and the document data to the electronic processing apparatus.

According to a further embodiment of the present invention, a computer program product is adapted for physically verifying a correct association between information printed on a closed face package and material and/or information contained inside the closed face package. The closed face package includes a document inserted within the package, and the package has a window permitting a portion of the document to be read from a location outside of the package. The computer program product comprises computer-executable instructions embodied in a computer-readable medium for performing steps comprising the following. Package data is received. The package data is printed on the closed face package and read from the package by a first reading device. Document data is also received. The document data is printed on the inserted document and appears through the window of the package. A data file is read to access account information stored therein corresponding to the document data. At least a portion of the accessed account information is compared with the package data to determine whether a matching association exists between the package data and the document data. If the matching association is determined to exist, the package is allowed to be further processed. If the matching association is determined not to exist, the package is prevented from being further processed.

It is therefore an object of the present invention to provide real time verification that information printed on a closed face package corresponds to materials and information disposed inside the closed face package.

Some of the objects of the invention having been stated hereinabove, other objects will become evident as the description proceeds when taken in connection with the accompanying drawings as best described hereinbelow.

DETAILED DESCRIPTION OF THE INVENTION

Figure 1:
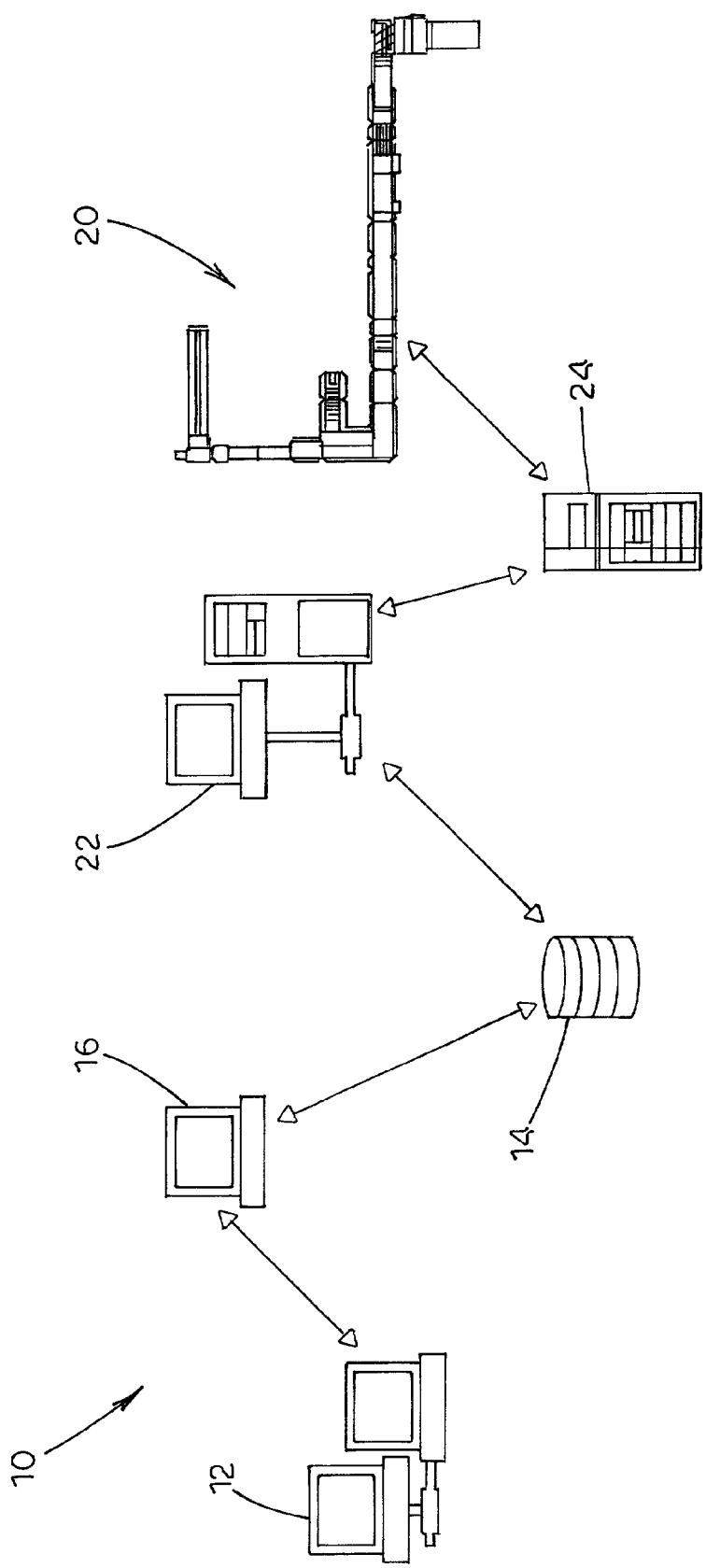
FIG. 1 is a schematic diagram of a mail processing system in which the present invention can be implemented.

Referring now to FIG. 1, a non-limiting example is illustrated of a document handling or mail processing system, generally designated 10, in which the present invention can be implemented. In the present example, mail processing system 10 can be characterized as a closed loop solution which connects a host system or network 12 to the mailroom floor and provides custom processing information and real-time mailpiece tracking for each mailpiece. As used herein, the term "mailpiece" generally refers to an assembled, predetermined, inserted document or documents, together with any inserts. Typically, the operator of equipment included within mail processing systems such as mail processing system 10 can track and control the handling of individual mailpieces throughout the inserter operations through the use of a conventional job tracking system equipped with photocell devices or similarly functioning devices, thereby increasing mailing integrity to some degree. Missing or damaged mailpieces or elements thereof, as well as duplicates, can be automatically detected, and reprints can be generated accordingly. A manifest can be automatically generated that is based on the actual mail produced, and not just what was originally planned to be produced. Mail processing system 10 as exemplified herein preferably operates in conjunction with a data file containing the instructions for the handling of each mailpiece, which data file typically is stored in a database residing on a database server 14. On-document barcode is thus minimized since all of the customer-specific information can be stored in the database instead of having to be scanned off the printed document. Additionally, inserts can be automatically and selectively fed into a mailpiece if instructions for doing so are contained in the data file. As is known by those skilled in the art, an "insert" ordinarily constitutes a single paper or card that is to be included as a supplementary item in a mailpiece.

A typical architecture for mail processing system 10 includes a supervisor computing device such as a supervisor PC 16, which provides a central terminal for monitoring networked mail processing machinery and serves as a gateway to database server 14. Supervisor PC 16 executes a supervisor program which supports the loading and unloading of data files, preand post-processing pull features, and the generation of combined reports as well as reprint files. The supervisor program can also be used to manage users, create job set-ups and corresponding materials, generate historical reports and manifests, and perform database maintenance and site configuration.

Also provided is mail insertion and processing equipment in the form of an inserter, generally designated 20. Inserter 20 is the machine that physically delivers sets of pre-printed sheets or documents from upstream devices and adds selected inserts. Each document is then placed into an envelope. Each envelope is sealed and sorted by predetermined characteristics configured on supervisor PC 16. Database server 14 is provided to serve as the database computer to provide and retrieve processing information for each mail processing machine such as inserter 20. Supervisor PC 16 is utilized to transfer data from the data file to and from database server 14. For instance, job processing instructions can be set up at supervisor PC 16 and maintained on database server 14, and then made available to inserter 20 which processes the job. A console 22 with its operative software applications serves as the user interface to inserter 20 via a machine control computer 24. Operators of inserter 20 can use console 22 to run job setups created by the supervisor program on supervisor PC 16. These jobs inform inserter 20 as to the layout of the document, the type of fold to use, the numbers corresponding to the insert hoppers which contain the inserts, what kind of addressing is needed, and how to handle the completed envelope. Operator, shift and job activity as well as operator and inserter efficiency on console 22 can be tracked by the supervisor program. Machine control computer 24 serves as the interface between console 22 and inserter 20. The machine control is an embedded control system that directly controls the motors of inserter 20. Typically, there is no operator interaction with machine control computer 24. The various computers utilized in a mail processing system such as that described herein are networked to each other via cabling as needed.

Figure 2:
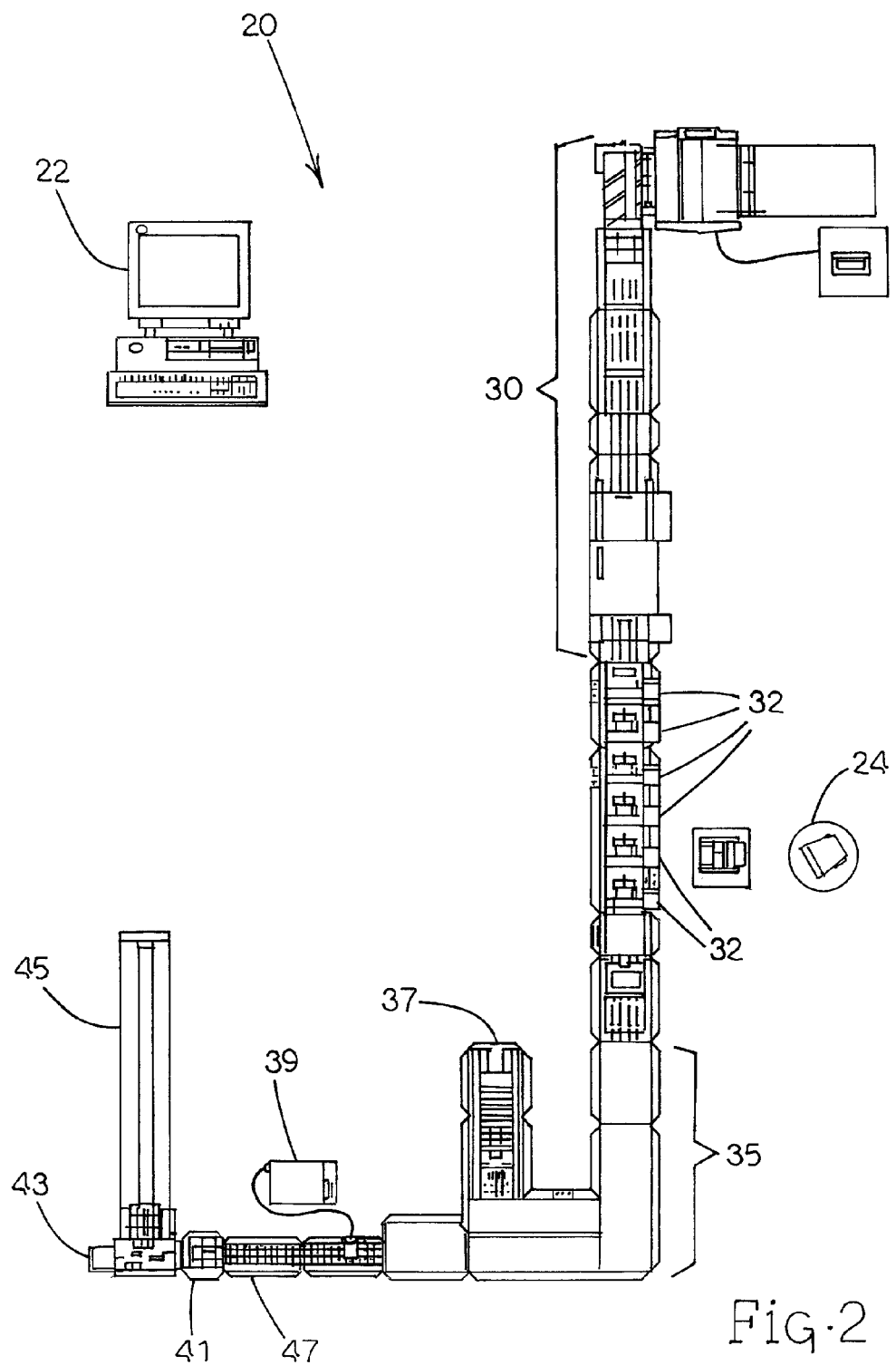
FIG. 2 is a schematic diagram of a mail inserting apparatus in which the present invention can be implemented.

Referring now to FIG. 2, exemplary mail inserter 20 is illustrated in more detail. It should be noted that mail inserters in general can include a number of different types of components and stations known to those skilled in the art, depending on the types of mail processing jobs and operations contemplated. FIG. 2 illustrates some examples. Accordingly, a front section 30 of inserter 20 includes components for implementing such operations as loading, accumulating, folding and collating documents. A series of insert hoppers 32 are included for adding inserts as demanded by the particular job being run. During the creation of a data file, data relating to each insert and its location in insert hoppers 32 are specified. A stuffing or inserting station 35 includes an envelope hopper 37 and other components necessary for stuffing or inserting the related set of documents and inserts into an envelope or other type of mail package. An envelope printer 39 for ink jet addressing, for example, is situated downstream of stuffing station 35, as well as a special handling station 41, reject bin 43, and a final destination conveyor 45. Envelope printer 39 is employed in cases where the envelope to be used does not have a see-through window displaying the address.

Figure 3:
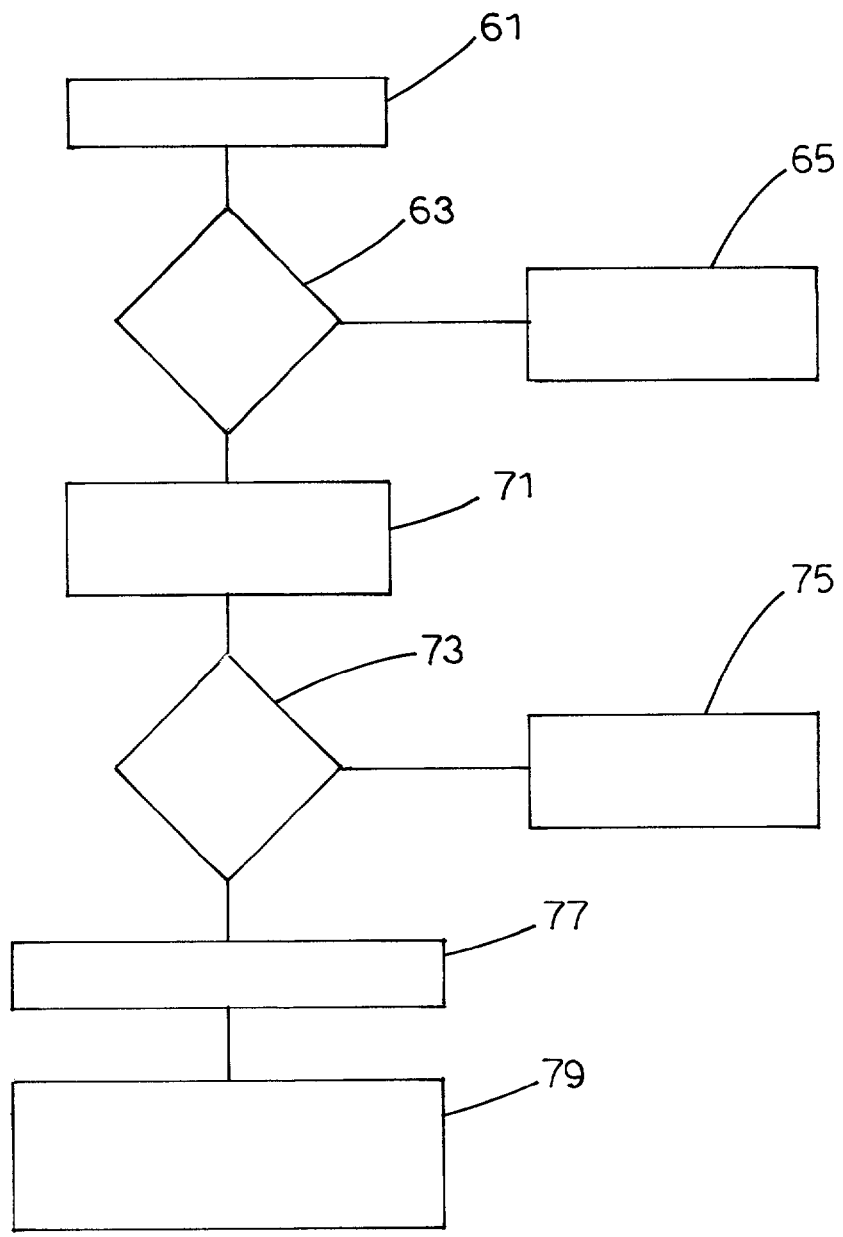
FIG. 3 is a flow diagram illustrating verification procedures carried out according to the present invention.

Referring to FIG. 3, a barcode or other control indication printed on a control document of the document set is read off the control document in step 61, typically at a front end location of inserter 20, and the corresponding document identification data is extracted or retrieved from the database. The data ordinarily include the final destination of the mailpiece and instructions as to which inserts, if any, to include. These processing instructions are passed on to inserter 20 in real time and the job is completed according to the mail-run instructions contained in the data file. As described previously, in this manner, the barcode need only contain the document ID and the rest of the mailpiece data can be stored in the database. When the envelope is stuffed with the appropriate documents and inserts and the stuffed envelope is transported to envelope printer 39, the system sends a data request signal to extract the corresponding address data from the data file. The address data are sent to envelope printer 39, and envelope printer 39 is instructed to print the extracted address data onto the stuffed envelope when the envelope has been properly positioned under the print head. Similarly, if the data file contains other information that should be printed on the envelope, that information is printed as well.

As part of the job tracking capability of mail processing system 10, envelope printer 39 can send a signal to machine control computer 24 to indicate that envelope printer 39 has printed the address data on the envelope. This signal can be sent in response to an inquiry made by the system software in step 63 in FIG. 3. If envelope printer 39 indicates that it has printed an address, then machine control computer 24 permits the envelope to be further processed and mailed. If no signal is sent by envelope printer 39 indicating that address data has been printed at the point in time when envelope printer 39 is queried, then a step 65 is taken to ensure that this particular envelope is rejected and not mailed. This procedure, however, is not sufficient for obtaining a verification that the contents of the envelope actually match data printed on the envelope. As described hereinabove, the conventional manner for physically verifying mailpieces involves randomly pulling a stuffed envelope off-line and tearing the envelope open to manually determine whether the mailpiece comprising one or more documents and inserts matches information printed on the envelope by envelope printer 39.

Figure 4A:
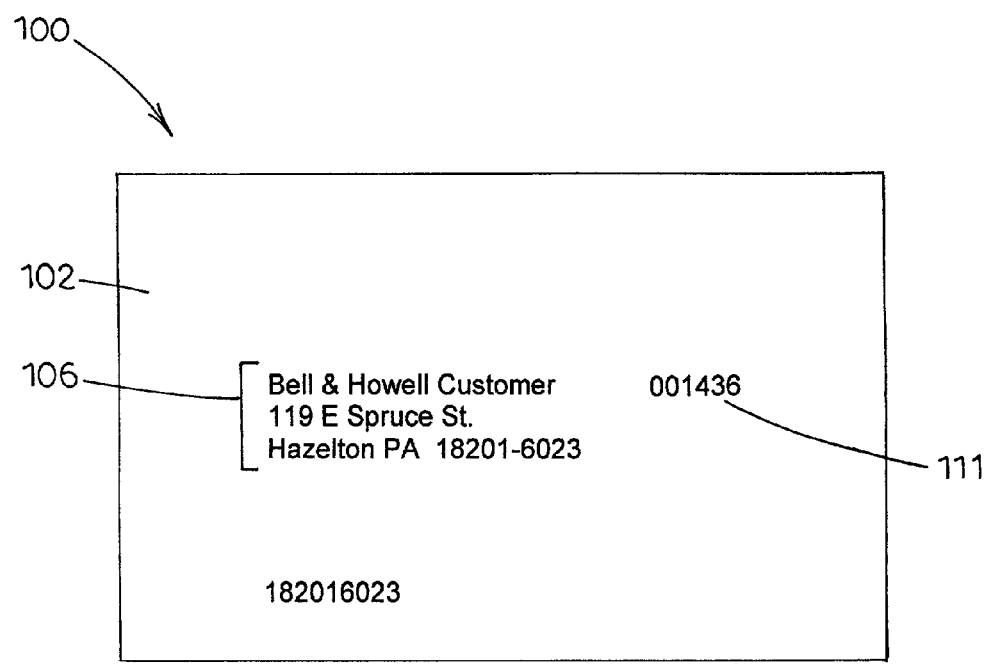
FIGS. 4A and 4B are plan views of the front and rear faces, respectively, of an envelope utilized in accordance with the present invention.
Figure 4B:
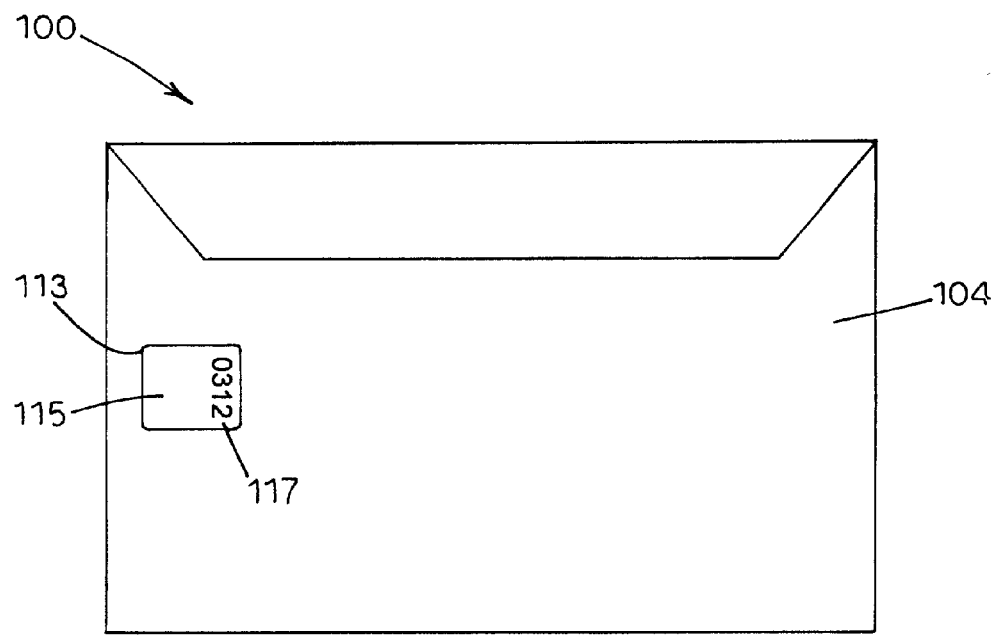

In accordance with the present invention, a complete physical verification is implemented by effecting an optical verification procedure at an optical verification site 47 disposed downstream of envelope printer 39 (see FIG. 2). Preferably, the optical verification procedure is controlled and executed by system software. One or more optical scanners or readers (not specifically shown), but preferably two readers, are operatively mounted at optical verification site 47, and are adapted to read symbologies or characters sets such as those commonly known as Data Matrix, Data Glyph, Bar Code 39, OCR, Post Net barcode, Planet Code, Interleaved 2 of 5, and PDF 417. In one embodiment, the optical scanner is an OCR reader available from Cognex Corporation and designated as Model No. 8110. The optical verification procedure is carried out with the use of mail packages such as envelope illustrated in FIGS. 4A and 4B, generally designated 100. FIG. 4A illustrates a front face 102 of envelope 100, and FIG. 4B illustrates a rear face 104 of envelope 100. On front face 102, address data 106 has been sprayed by envelope printer 39 pursuant to instructions contained in the data file. In addition, package data 111 obtained from the data file, and in a symbological or characteristic format such as those delineated hereinabove, has also been sprayed onto front face 102 by envelope printer 39. Rear face 104 of envelope 100 includes a window 113 which could be open or protected by a translucent layer such as a plastic film. A control document 115 forming a part of the mail articles comprising this particular mailpiece is visible through window 113. Document data 117 specific to the data file for this mailpiece has been printed on control document 115, again in a symbological or characteristic format such as those delineated hereinabove. The verification software associated with mail processing system 10 according to the present invention is configured such that document data 117 will be visible through window 113. That is, the articles to be included with the mailpiece are collated, folded and inserted such that control document 115 resides directly adjacent to the inside surface of rear face 104 of envelope 100, and document data 117 is printed at a specific location on control document 115 according to the predetermined location of window 113.

In the exemplary embodiment illustrated in FIGS. 4A and 4B, package data 111 has been printed on front face 102 of envelope 100 and window 113 of envelope 100 is disposed on rear face 104. It will be understood, however, that package data 111 could be printed on either front face 102 or rear face 104 of envelope 100, window 113 could be provided on either front face 102 or rear face 104, and package data 111 and window 113 could be disposed either on the same face 102 or 104 of envelope or on opposing faces 102 and 104. It will be further noted that the respective symbologies comprising package data 111 and document data 117 do not need to be the same. As a result, one of the optical readers provided in accordance with the present invention can be adapted to read one type of symbology while another optical reader provided can be adapted to read another type of symbology.

Referring back to FIG. 3 with secondary reference being made to FIGS. 2, 4A and 4B, the verification process according to the present invention is broadly represented by steps 71–79, and it will be understood that this process can be implemented with or without steps 61–65 described hereinabove. Address data 106 and package data 111 based on account information acquired in step 61 are sprayed on envelope 100 by envelope printer 39. Assuming envelope 100 is to be further processed and not rejected pursuant to step 65, envelope 100 is carried forward to optical verification site 47. At optical verification site 47, the optical readers are activated in step 71. The first optical reader reads package data 111 off either front face 102 or rear face 104 of envelope 100, and the second optical reader reads document data 117 through window 113 (which is located on either front face 102 or rear face 104 of envelope 100). The data read by the optical readers is sent to machine control 24, where the software verifies in step 73 whether both package data 111 and document data 117 match corresponding account information contained in the targeted data file stored on database server 14. If the match is verified, envelope 100 is allowed to be further processed in step 75. If the match fails to be verified, an error message is displayed in step 77 at machine control console 22 and inserter 20 is rendered inoperable in step 79. Further measures can also be taken in step 79, such as the activation of an alarm or the automatic contacting of engineering personnel.

It should be noted that the orientation of the optical readers can be either "east-to-west" or "north-to-south", and that the orientation of each optical reader can be the same or different from that of the other. In the present example, package data 111 has been sprayed along an east-to-west line (see FIG. 4A) and document data 117 appears along a north-to-south line, which requires that one of the optical readers operate along the east-to-west orientation while the other optical reader operate along the north-to-south orientation. Preferably, the optical readers are adjustably mounted or otherwise adapted to read in either the east-to-west or north-to-south directions as desired by the user. In this manner, the printing process itself does not need to be modified from job to job. It is contemplated by the present invention that a single optical reader could be developed for reading both package data 111 and document data 117, thus eliminating the need for providing more than one optical reader.

It thus can be seen that the present invention provides a novel solution for physically verifying on a real-time basis that the enclosed contents of a mail piece or other enclosure actually and correctly match the printed address or other information on the mail piece.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for verifying a correct association between information printed on a closed face package and material and/or information contained inside the closed face package, the method comprising the steps of:
    (a) providing a closed face package including a document inserted within the package, wherein the package has a window permitting a portion of the document to be read from a location outside of the package, and wherein the package comprises:
        (i) package data printed on the package and corresponding to account information corresponding to a mail recipient; and
        (ii) document data printed on the inserted document, the document data corresponding to the inserted document and corresponding to the account information;
    (b) providing a data file to access the account information stored therein, the data file corresponding to the package data, the document data, and to address data;
    (c) acquiring the address data representing recipient address information from the stored account information, sending printing instructions to a printer, and causing the printer to print the recipient address information on the closed face package;
    (d) determining at a predetermined point in time whether the printer has performed a printing operation on the closed face package and causing the closed face package to be rejected if the printer has not performed the printing operation at the predetermined point in time;
    (e) using a first reading device to optically read the printed package data on the package;
    (f) using a second reading device to optically read the printed document data on the inserted document and appearing through the window;
    (g) reading the data file to access the account information stored therein;
    (h) comparing at least a portion of the accessed account information with the package data and comparing at least a portion of the accessed account information with the document data to determine whether a matching association exists between the package data and the document data;
    (i) if the matching association is determined to exist, allowing the package to be further processed; and
    (i) if the matching association is determined not to exist, preventing the package from being further processed.

2. The method according to claim 1 wherein the package is an envelope.

3. The method according to claim 1 wherein the package data is printed on a first side of the package and the window is located on the first side.

4. The method according to claim 1 wherein the package data is printed on a first side of the package and the window is located on an opposing second side of the package.

5. The method according to claim 1 wherein the first reading device reads the package data in a generally linear first direction and the second reading device reads the document data in a generally linear second direction generally transverse to the first direction.

6. The method according to claim 1 wherein at least one of the reading devices is adapted to read data in Data Matrix format.

7. The method according to claim 1 wherein at least one of the reading devices is adapted to read data in Data Glyph format.

8. The method according to claim 1 wherein at least one of the reading devices is adapted to read data in Bar Code 39 format.

9. The method according to claim 1 wherein at least one of the reading devices is adapted to read data in OCR format.

10. The method according to claim 1 wherein at least one of the reading devices is adapted to read data in Post Net barcode format.

11. The method according to claim 1 wherein at least one of the reading devices is adapted to read data in Planet Code format.

12. The method according to claim 1 wherein at least one of the reading devices is adapted to read data in Interleaved 2 of 5 format.

13. The method according to claim 1 wherein at least one of the reading devices is adapted to read data in PDF 417 format.

14. The method according to claim 1 wherein the stored account information includes mail address information.

15. The method according to claim 1 comprising the step of indicating an error condition if the matching association is determined not to exist.

16. The method according to claim 15 wherein the step of indicating an error condition includes the step of displaying a human-readable error message.

17. The method according to claim 15 wherein the step of indicating an error condition includes the step of updating a database file with a print failure code.

18. The method according to claim 1 wherein the step of preventing the package from being further processed includes the step of rendering inoperable a mail processing machine by which the package is being processed.

19. The method according to claim 1 comprising the steps of reading a control code printed on the document and using the control code to locate the data file.

20. A computer program product adapted for verifying a correct association between information printed on a closed face package and material and/or information contained inside the closed face package, wherein the closed face package includes a document inserted within the package and the package has a window permitting a portion of the document to be read from a location outside of the package, the computer program product comprising computer-executable instructions embodied in a computer-readable medium for performing steps comprising:
    (a) receiving package data optically read by a first reading device, the package data printed on the closed face package and corresponding to account information corresponding to a mail recipient;

(b) receiving document data optically read by a second reading device, the document data printed on the inserted document and appearing through the window of the package, the document data further corresponding to the inserted document and corresponding to the account information;

(c) acquiring address data representing recipient address information from the account information, sending printing instructions to a printer, and causing the printer to print the recipient address information on the closed face package;

(d) determining at a preset point in time whether the printer has performed a printing operation on the closed face package, and causing the closed face package to be rejected if the printer has not performed the printing operation at the predetermined point in time;

(e) reading a data file to access the account information stored therein, the data file corresponding to the package data, the document data, and the address data printed on the package, the address data corresponding to the account information including the recipient address information;

(f) comparing at least a portion of the accessed account information with the package data and comparing at least a portion of the accessed account information with the document data to determine whether a matching association exists between the package data and the document data;

(g) if the matching association is determined to exist, allowing the package to be further processed; and (h) if the matching association is determined not to exist, preventing the package from being further processed.

21. The computer program product according to claim 20 comprising causing the first reading device to read the package data in a generally linear first direction and causing the second reading device to read the document data in a generally linear second direction generally transverse to the first direction.

22. The computer program product according to claim 20 comprising indicating an error condition if the matching association is determined not to exist.

23. The computer program product according to claim 22 wherein the step of indicating an error condition includes the step of displaying a human-readable error message.

24. The computer program product according to claim 22 wherein the step of indicating an error condition includes the step of updating a database file with a print failure code.

25. The computer program product according to claim 20 wherein the step of preventing the package from being further processed includes the step of rendering inoperable a mail processing machine by which the package is being processed.

26. The computer program product according to claim 20 comprising receiving a control code read from the document and using the control code to locate the data file.

* * * * *